United States Patent
Jiang et al.

(10) Patent No.: US 7,839,764 B2
(45) Date of Patent: Nov. 23, 2010

(54) WIRELESS SENSOR NETWORK GATEWAY UNIT WITH FAILED LINK AUTO-REDIRECTING CAPABILITY

(75) Inventors: Joe-Air Jiang, Taipei (TW); En-Cheng Yang, Taipei (TW); Chwan-Lu Tseng, Taipei (TW); Chia-Pang Chen, Taipei (TW); Tzu-Shiang Lin, Taipei (TW); Yung-Cheng Wu, Taipei (TW); Chen-Ying Lin, Taipei (TW); Chu-Ping Tseng, Taipei (TW); Shih-Hsiang Lin, Taipei (TW); Chih-Sheng Liao, Taipei (TW); Shih-Hao Szu, Taipei (TW); Chung-Wei Yen, Taipei (TW); Kuang-Chang Lin, Taipei (TW); Zong-Siou Wu, Taipei (TW); Fu-Ming Lu, Taipei (TW)

(73) Assignee: National Taiwan University, Taipei (TW)

( * ) Notice: Subject to any disclaimer, the term of this patent is extended or adjusted under 35 U.S.C. 154(b) by 101 days.

(21) Appl. No.: 12/229,105

(22) Filed: Aug. 19, 2008

(65) Prior Publication Data
US 2009/0252032 A1  Oct. 8, 2009

(30) Foreign Application Priority Data
Apr. 3, 2008  (TW)  ............... 97112113 A (51) Int. Cl.
*H04J 1/11* (2006.01)
*H04J 3/16* (2006.01)
*H04L 12/28* (2006.01)

(52) U.S. Cl. .............. 370/216; 370/401; 370/466
(58) Field of Classification Search .......... 370/216, 370/401, 466, 465
See application file for complete search history.

(56) References Cited

U.S. PATENT DOCUMENTS

| | | | |
|---|---|---|---|
| 2007/0152813 A1* | 7/2007 | Mathur et al. | 340/539.22 |
| 2007/0293232 A1* | 12/2007 | Nonaka | 455/450 |
| 2008/0065427 A1* | 3/2008 | Helitzer et al. | 705/4 |
| 2009/0146815 A1* | 6/2009 | Cho | 340/572.1 |
| 2009/0168703 A1* | 7/2009 | Pandey et al. | 370/329 |
| 2009/0224926 A1* | 9/2009 | Brusveen et al. | 340/595 |
| 2009/0306850 A1* | 12/2009 | Lee et al. | 701/33 |
| 2009/0312667 A1* | 12/2009 | Utsunomiya et al. | 600/549 |
| 2010/0016745 A1* | 1/2010 | Crump et al. | 600/519 |

* cited by examiner

*Primary Examiner*—Andrew Lee
(74) *Attorney, Agent, or Firm*—Peter F. Corless; Steven M. Jensen; Edwards Angell Palmer & Dodge LLP (57) ABSTRACT

A wireless sensor network gateway unit is proposed, which is designed for integration to a wireless sensor network (WSN) for providing a gateway function with a failed link auto-redirecting capability for the wireless sensor network. The proposed WSN gateway unit is characterized by the provision of an failed link auto-redirecting capability, which can respond to the failure of any sensor node in the WSN system by performing a failed link auto-redirecting operation for redirecting the down-linked good sensor nodes for linking to a nearby good sensor node to thereby allow the down-linked good sensor nodes to be nevertheless able to transfer data to the WSN gateway unit of the invention. This feature allows the WSN gateway unit of the invention to maintain good operational reliability for the WSN system.

25 Claims, 5 Drawing Sheets

WIRELESS SENSOR NETWORK GATEWAY UNIT WITH FAILED LINK AUTO-REDIRECTING CAPABILITY

BACKGROUND OF THE INVENTION

1. Field of the Invention

This invention relates to ecological environment monitoring technology, and more particularly, to a wireless sensor network gateway unit with failed link auto-redirecting capability which is designed for integration to a wireless sensor network (WSN) for providing a gateway function with a failed link auto-redirecting capability for the wireless sensor network.

2. Description of Related Art

In agricultural research and management, it is an important task to monitor the ecological environment of a farmland used to cultivate crops such as fruits, rice, and vegetables. The main purpose is to collect a set of ecological data that are considered as vital factors that would significantly affect the cultivation and growth of crops on the farmland. These ecological data include, for example, number of clustered pests (such as fruit flies) per unit area, temperature, humidity, sunlight amount, and wind speed, to name a few. Research personnel can analyze these ecological data for effective management of the farmland to achieve optimized crop production.

Traditionally, the collection of ecological data from farmlands is carried out by human labor work. For example, the number of pests per unit area is collected by firstly using a net to capture a group of pests within a certain area, and then visually counting the total number of pests being captured in the net, and finally using statistical methods to estimate the total number of pests within the entire area. All these works are carried out by human labor. For collection of climate-related ecological data (temperature, humidity, sunlight amount, wind speed, etc.), this task is traditionally carried out by installing temperature sensors, humidity sensors, sunlight amount sensors, wind speed sensors on the farmland; and the sensed data are visually inspected and manually recorded by the research/management personnel. The collected ecological data are then analyzed and compiled by the research personnel into written reports. These written reports are then used as references for management of the farmland to achieve optimized crop production. For example, if the number of pests per unit area is considered to be overly large, pest-killing or expelling means should be provided; if temperature/humidity is too high, conditioning means should be installed; and if the wind speed is too high, wind-shielding means should be installed.

One apparent drawback to the labor-based work for ecological data collection is that it is quite tedious, laborious, and time-consuming for the research/management personnel to carry out. Moreover, if the farmland is located at a remote site, such as a distant mountain or rural place, the research/management personnel might have to spend lots of time and cost in the travel to the farmland.

In view of the aforementioned drawback of the traditional approach for ecological data collection and analysis, there exists a need in the field of agricultural research and management for a system that allows remote and automatic monitoring of the ecological environment of a farmland without requiring the research/management personnel to travel to the farmland or collect the ecological data by human labor.

In the construction of an ecological environment remote monitoring system, wireless sensor network (WSN) and gateway unit are two essential components for front-end implementation of the system. A WSN is composed of a plurality of wireless linked sensor nodes which can transmit data to the gate unit by a multihop routing method. In practical use, however, the failure of one single sensor node in the WSN system would cause all the other sensor nodes that are down-linked to the failed sensor node to suffer from a failed link, thus unable to transfer their sensed ecological data to the gateway unit. In other words, the failure of one single sensor node could affect the overall operational reliability of the WSN system.

SUMMARY OF THE INVENTION

It is therefore an objective of this invention to provide a wireless sensor network gateway unit with failed link auto-redirecting capability which can automatically respond to a node-failure event in the WSN system to perform a failed link auto-redirecting operation for allowing all other good sensor nodes in the WSN system to operate normally despite the failure of one sensor node.

The wireless sensor network gateway unit of the invention is designed for integration to a wireless sensor network (WSN) for providing a gateway function with a failed link auto-redirecting capability for the wireless sensor network.

In architecture, the wireless sensor network gateway unit of the invention comprises: (A) a WSN linking module; (B) a WSN configuration module; (C) a data transmission module; (D) a wireless communication linking module; (E) a node-failure event responding module; and (F) a failed-link redirecting module.

The wireless sensor network gateway unit of the invention is characterized by the provision of an failed link auto-redirecting capability, which can respond to the failure of any sensor node in the WSN system by performing a failed link auto-redirecting operation for redirecting the down-linked good sensor nodes for linking to a nearby good sensor node to thereby allow the down-linked good sensor nodes to be nevertheless able to transfer data to the WSN gateway unit of the invention. This feature allows the WSN gateway unit of the invention to maintain good operational reliability for the WSN system.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The wireless sensor network gateway unit with failed link auto-redirecting capability according to the invention is disclosed in full details by way of preferred embodiments in the following with reference to the accompanying drawings.

Application of the Invention

Figure 1:
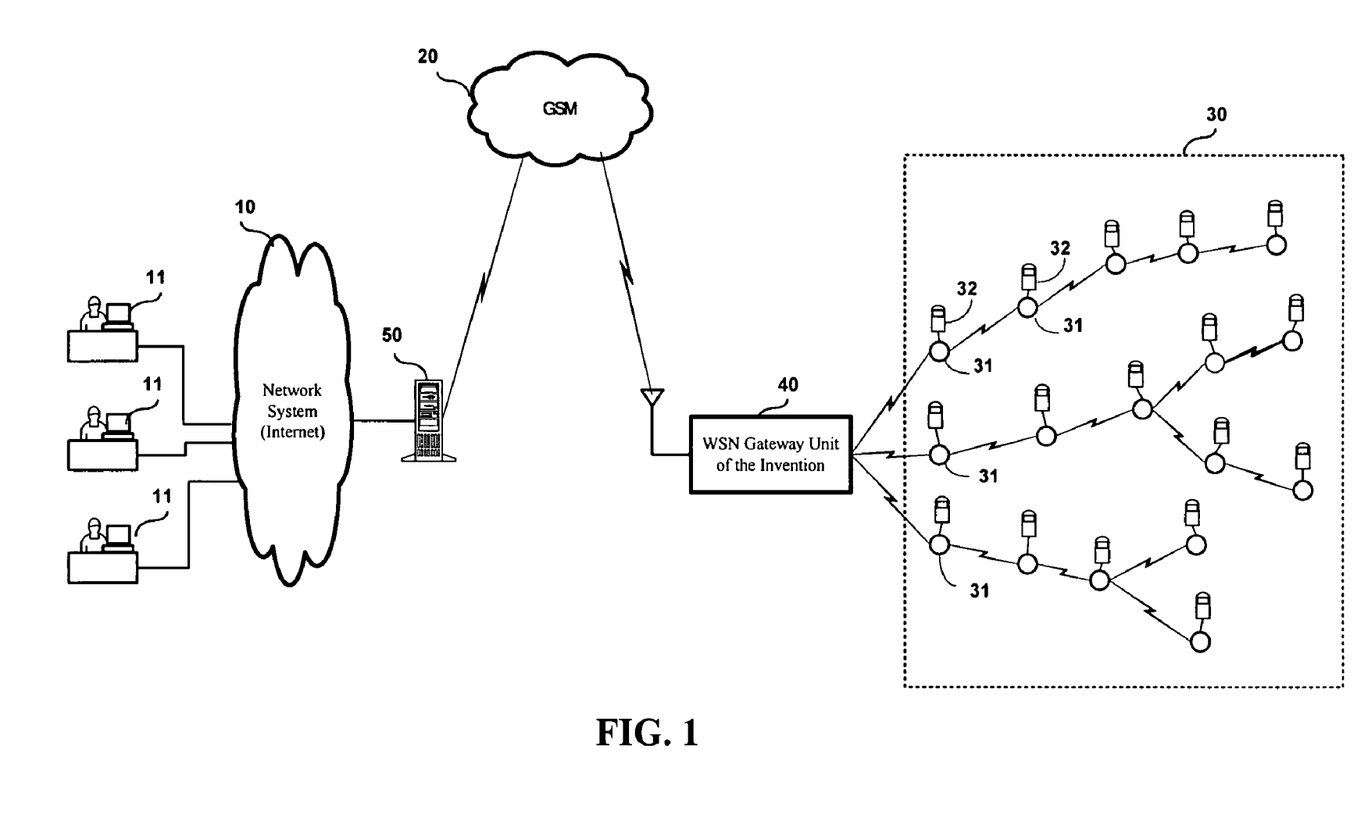
FIG. 1 is a schematic diagram showing an application example of the WSN gateway unit of the invention.

FIG. 1 is a schematic diagram showing an application example of the wireless sensor network gateway unit with failed link auto-redirecting capability according to the invention (which is here encapsulated in a box indicated by the reference numeral 40, and is hereinafter referred in short as "WSN gateway unit"). As shown, the WSN gateway unit of the invention 40 is designed for integration to a network-based ecological environment remote monitoring system, which is for example used for remote monitoring of the ecological environment of a farmland or a garden, and whose architecture includes a back-end network system 10, a wireless communication system 20, a front-end wireless sensor network (WSN) system 30, a front-end gateway (which is implemented with the WSN gateway unit of the invention 40), and a back-end host server 50. In operation, the WSN gateway unit of the invention 40 is used to allow the remotely-situated front-end WSN system 30 to exchange data via the wireless communication system 20 with the locally-situated back-end host server 50.

In practice, for example, the network system 10 can be implemented with the Internet, an intranet, an extranet, or a LAN (Local Area Network) system, which allows a network workstation 11 to be linked to the host server 50, so that the user of the network workstation 11 (i.e., research/management personnel) can use the network workstation 11 to browse the ecological data that have been uploaded by the WSN gateway unit of the invention 40 to the host server 50.

The wireless communication system 20 can be implemented with, for example, the public GSM (Global System for Mobile Communications) system or any type of wireless communication system, which allows the front-end gateway (i.e., the WSN gateway unit of the invention 40) to communicate with the back-end host server 50 in a wireless manner; i.e., it allows the WSN gateway unit of the invention 40 to transfer all collected ecological data via the GSM wireless communication system 20 to the host server 50.

The wireless sensor network (WSN) system 30 is composed of a clustered array of sensor nodes 31. In practice, for example, the sensor nodes 31 can be each implemented with a microprocessor-based sensor device controlled by the TinyOS operating system (which is a well-known operating system for WSN node devices), and which can communicate with each other in a wireless manner by a standard wireless communication protocol, such as Zigbee or Bluetooth. Each sensor nod 31 in the WSN system 30 is capable of sensing the environment for acquiring a set of ecological data including, for example, geographical position, temperature, humidity, sunlight amount, wind speed, to name a few. In addition, each sensor node 31 can be linked to a pest-counting device 32 which is capable of providing a counting function that can be used for statistically determining the number of pests (such as fruit flies) within the region where the WSN system 30 is installed.

The above-mentioned pest-counting device 32 is preferably implemented with a multi-checkpoint type clustered animal counting device, whose architecture is disclosed in the applicant's another patent application entitled "MULTI-CHECKPOINT TYPE CLUSTERED ANIMAL COUNTING DEVICE". This patent-pending multi-checkpoint type clustered animal counting device is capable of counting the number of a clustered group of pests (such as fruit flies) by luring them to enter into a trapping room and using at two checkpoints for triggering a counter.

It is to be noted that, beside the above-mentioned application example shown in FIG. 1, the WSN gateway unit of the invention 40 can also be used for various other purposes, such as for integration to other types of remote monitoring system for providing a gateway function with failed link auto-redirecting capability for a wireless sensor network.

Function of the Invention

Figure 2:
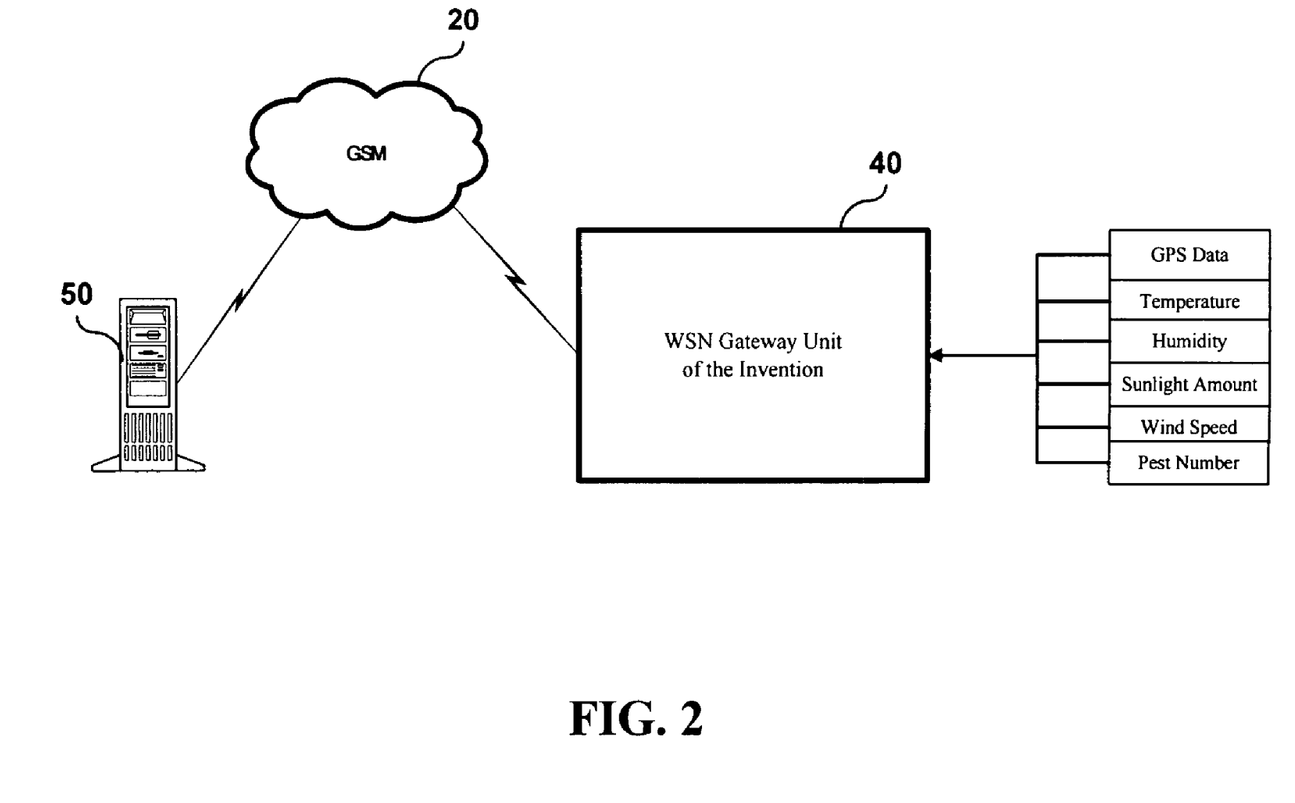
FIG. 2 is a schematic diagram showing the functional model of the WSN gateway unit of the invention.

FIG. 2 shows the functional model of the WSN gateway unit of the invention 40. As shown, the WSN gateway unit of the invention 40 is used to provide a gateway function between the remotely-situated front-end WSN system 30 and the locally-situated back-end host server 50 via the GSM system 20. In operation, the WSN gateway unit of the invention 40 receives all the ecological data sensed by each sensor node 31 in the WSN system 30, including geographical position, temperature, humidity, sunlight amount, wind speed, and number of pests (such as fruit flies), and transfer these ecological data via the GSM system 20 to the host server 50. In a bidirectional manner, the WSN gateway unit of the invention 40 can receive management control commands via the GSM system 20 from the host server 50 for management control of the WSN system 30.

In practice, the ecological data can be sensed and acquired by the WSN system 30, or alternatively by a built-in set of sensing functions that are integrated to the internal architecture of the WSN gateway unit of the invention 40. The detection of the geographical position can be implemented with a GPS (Global Positioning System) function, which is integrated to each sensor node 31 or to the WSN gateway unit of the invention 40.

Figure 4A:
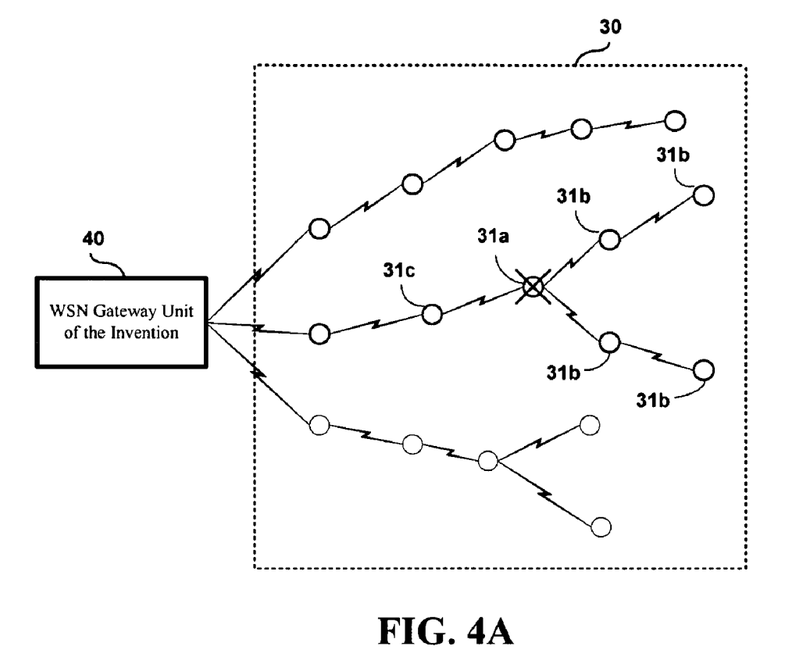
FIG. 4A is a schematic diagram used to depict the condition of a failure of a certain sensor node in the wireless sensor network.
Figure 4B:
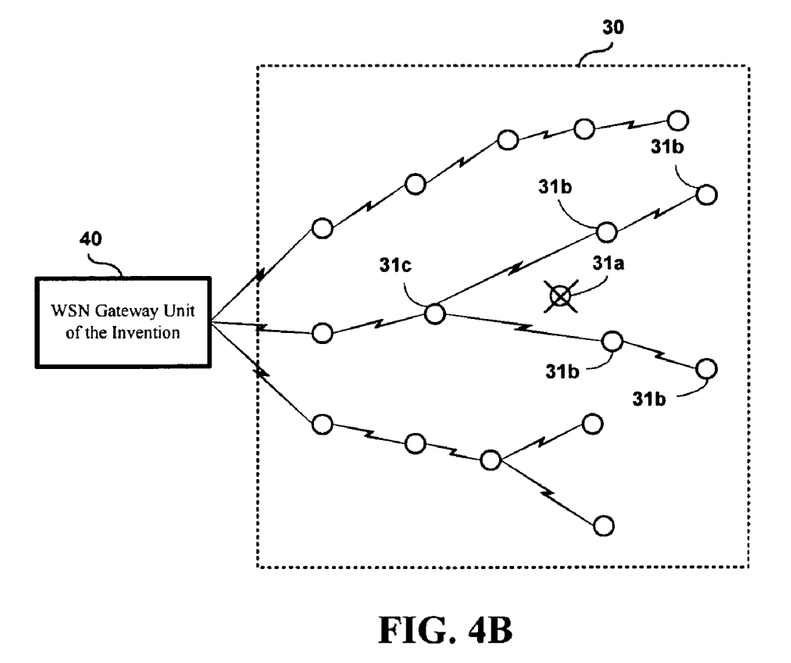
FIG. 4B is a schematic diagram showing the same of FIG. 4A after a failed link auto-redirecting operation has been performed to the wireless sensor network.

In addition, as illustrated in FIGS. 4A-4B, the WSN gateway unit of the invention 40 can respond to a node-failure event in the WSN system 30 (i.e., a sensor node 31a is failed) by performing a failed link auto-redirecting operation, for the purpose of relinking all the other sensor nodes (here designated by the reference numeral 31b) that were previously linked to the failed sensor node 31a to a good sensor node 31c, so that these other sensor nodes 31b can exchange data with the WSN gateway unit of the invention 40 via the newly-linked good sensor node 31c.

Architecture of the Invention

Figure 5:
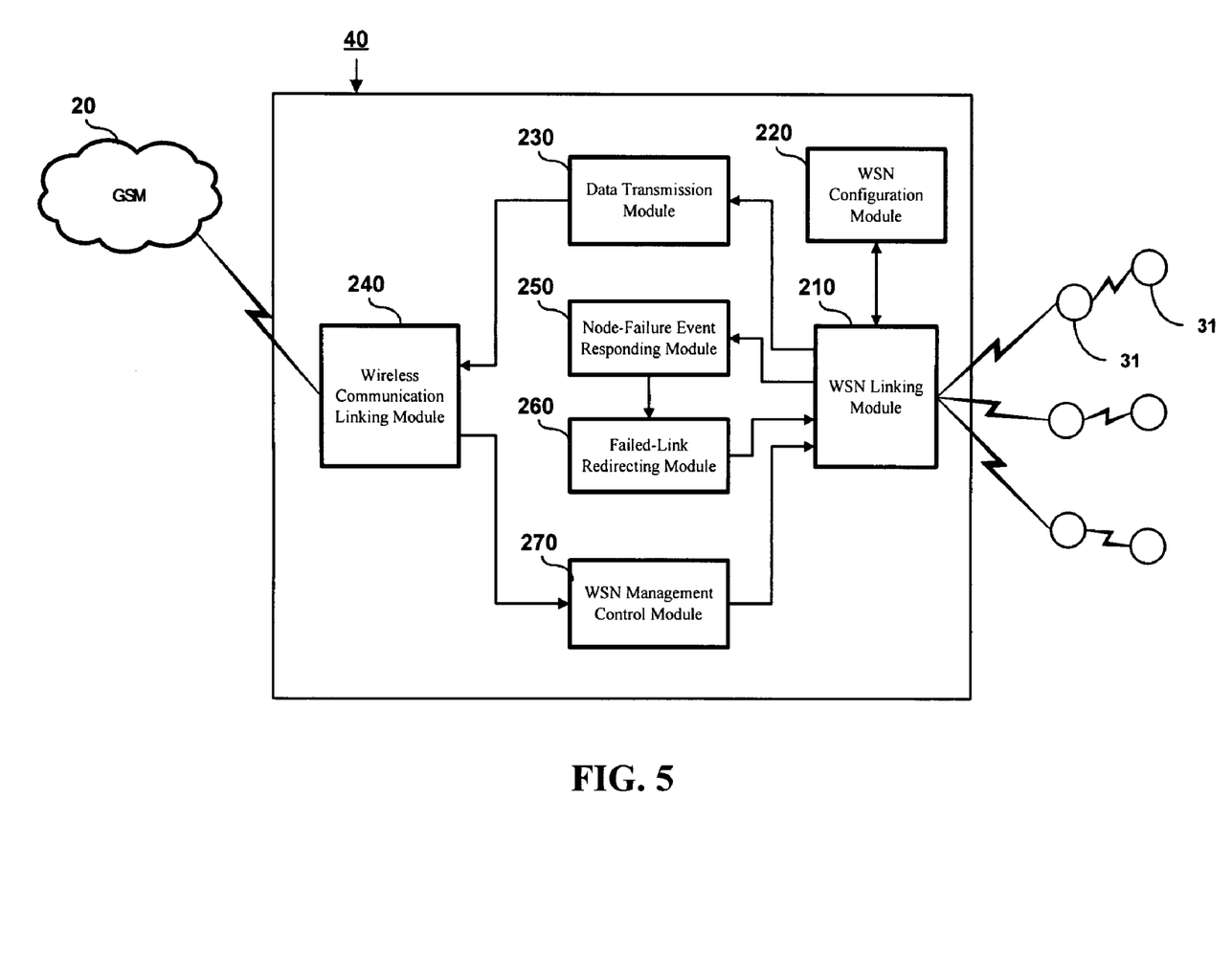
FIG. 5 is a schematic diagram showing the architecture of the WSN gateway unit of the invention.

As shown in FIG. 3, in architecture, the WSN gateway unit of the invention 40 comprises: (A) a wireless sensor network (WSN) linking module 210; (B) a wireless sensor network (WSN) configuration module 220; (C) a data transmission module 230; (D) a wireless communication linking module 240; (E) a node-failure event responding module 250; and (F) a failed-link redirecting module 260; and can further comprise: (G) a wireless sensor network (WSN) management control module 270. Firstly, the respective attributes and functions of these constituent elements of the invention are described in details in the following.

Wireless Sensor Network (WSN) Linking Module 210

The WSN linking module 210 is used for linking the WSN gateway unit of the invention 40 to the WSN system 30 for data exchange with each of the sensor nodes 31 in the WSN system 30; i.e., for receiving the ecological data sensed by each sensor node 31 and transferring management control commands to each sensor node 31 for management control of the operations of each sensor node 31.

In practice, for example, the data communication between the WSN linking module 210 and each sensor node 31 in the WSN system 30 is based on the standard S-MAC (Sensor Media Access Control) data communication protocol.

Wireless Sensor Network (WSN) Configuration Module 220

The WSN configuration module 220 is capable of configuring all the distributed sensor nodes 31 based on a predetermined topology for linking together all the sensor nodes 31 in a wireless manner to form the WSN system 30, in which each sensor node 31 can exchange data with the WSN linking module 210 by a multihop routing method.

Figure 3A:
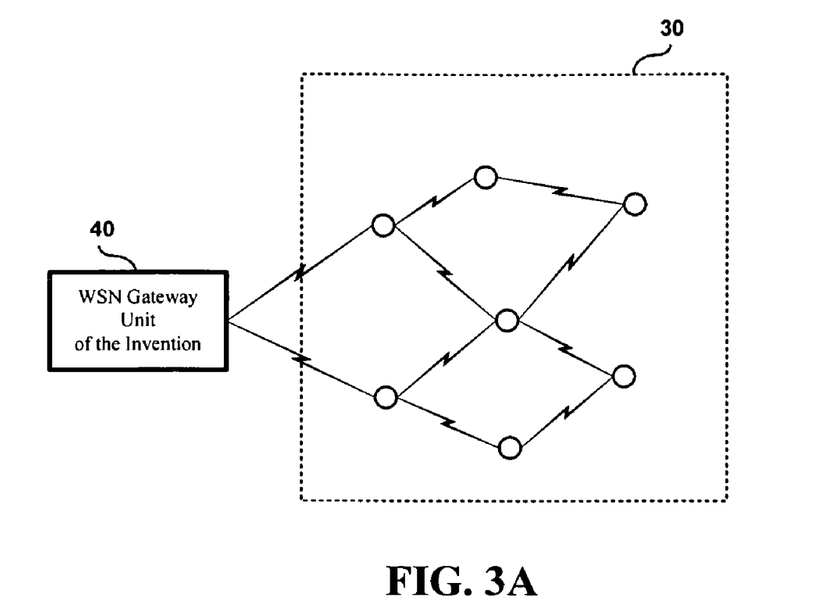
FIG. 3A is a schematic diagram showing a ring topology used by the WSN gateway unit of the invention for configuring the wireless sensor network.
Figure 3B:
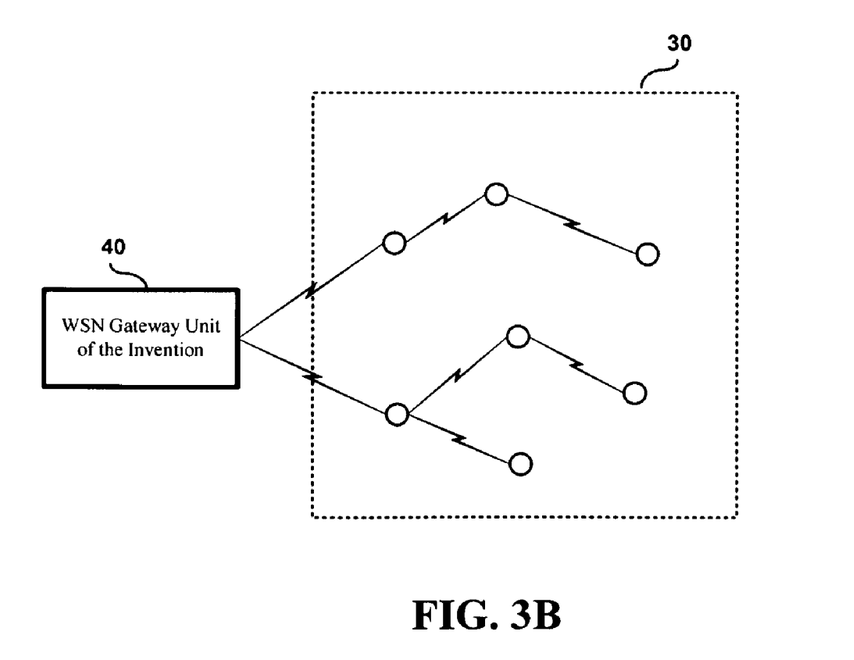
FIG. 3B is a schematic diagram showing a tree topology used by the WSN gateway unit of the invention for configuring the wireless sensor network.

In practice, the topology used for configuring the sensor nodes 31 in the WSN system 30 can be a ring topology as shown in FIG. 3A, or a tree topology as shown in FIG. 3B. In terms of data transmission efficiency, the tree topology shown in FIG. 3B is more preferable for use than the ring topology.

Data Transmission Module 230

The data transmission module 230 is used for transmission of each received set of ecological data (i.e., GPS geographical position, temperature, humidity, sunlight amount, wind speed, and pest number) via the WSN linking module 210 from the WSN system 30 by using a specific transmission data format that is compliant with the wireless communication protocol used by the wireless communication system 20.

In the case of the wireless communication system 20 being a GSM-based system, the transmission data format used by the data transmission module 230 can be, for example, the standard SMS (Short Message Service) or GPRS (General Packet Radio Service) data format Wireless Communication Linking Module 240

The wireless communication linking module 240 is used for linking the WSN gateway unit of the invention 40 in a wireless manner to the GSM system 20 (specifically, to a GSM subscriber's network address assigned to the host server 50) for data exchange with the host server 50 via the WSN system 30. When linked, the wireless communication linking module 240 is capable of bidirectional data exchange with the host server 50 by transferring each set of ecological data in SMS or GPRS data format via the GSM system 20 to the host server 50 and receiving management control commands issued by the host server 50 via the GSM system 20.

Node-Failure Event Responding Module 250

The node-failure event responding module 250 is used for detecting whether anyone of the sensor nodes 31 in the WSN system 30 fails to operate normally in its data routing capability; and if yes, capable of responding by issuing a redirection enable message. In the example shown in FIG. 4A, it is assumed that the failed sensor node is indicated by the reference numeral 31a, which causes all its down-linked sensor nodes (indicated by the reference numeral 31b) to be unable to transfer their sensed ecological data to the WSN gateway unit of the invention 40.

Failed-Link Redirecting Module 260

The failed-link redirecting module 260 is capable of responding to the redirection enable message from the node-failure event responding module 250 by performing a failed link auto-redirecting operation for the good sensor nodes 31b that are down-linked to the failed sensor node 31a, for the purpose of redirecting these down-linked good sensor nodes 31b for linking to a nearby good sensor node (such as the one indicated by the reference numeral 31c in FIG. 4B). This failed link auto-redirecting operation allows the down-linked good sensor nodes 31b to be able to transfer sensed ecological data via the newly-linked good sensor node 31c to the WSN gateway unit of the invention 40.

Wireless Sensor Network (WSN) Management Control Module 270

The WSN management control module 270 is capable of performing a set of user-specified or host-specified management control actions on the WSN system 30 in response to a set of management control commands issued by the host server 50 and received via the GSM system 20. In practice, the management control actions include, for example, power on/off control, clock synchronization, and sensor node initialization.

Practical Implementation of the Invention

In practical implementation, the WSN gateway unit of the invention 40 can be realized in various different manners, such as by using a personal computer unit or a programmable embedded microprocessor system. The advantage of using a personal computer unit for realization is that it has better system expandability for incorporating additional functions; whereas the advantage of using a programmable embedded microprocessor system is that it can operate with less electrical power consumption.

Operation of the Invention

The following is a detailed description of a practical application example of the WSN gateway unit of the invention 40 in actual operation. In this application example, it is assumed that the WSN gateway unit of the invention 40 is used as a component for integration to a network-based ecological environment remote monitoring system shown in FIG. 1 which is used for remote monitoring of a farmland for collecting a set of related ecological data, including temperature, humidity, sunlight amount, wind speed, and number of clustered pests (such as fruit flies).

Under normal operating condition, each sensor node 31 of the WSN system 30 will sense its environment for acquiring a set of ecological data (i.e., temperature, humidity, sunlight amount, wind speed, and number of clustered pests), and then transfer each set of sensed ecological data by a multihop routing method for routing the ecological data via one or more other sensor nodes 31 to the WSN gateway unit of the invention 40. In the WSN gateway unit of the invention 40, the WSN linking module 210 will receive these ecological data and forward them to the data transmission module 230, where the ecological data are converted into a specific transmission data format that is compliant with the GSM system 20, such as the SMS data format. The SMS-formatted ecological data are then transmitted via the wireless communication linking module 240 to the GSM system 20 for forwarding to the back-end host server 50.

In the event of a failure to anyone of the sensor nodes 31 in the WSN system 30 (i.e., a failed sensor node 31a is detected in the WSN system 30 as shown in FIG. 4A) that causes all the sensor nodes 31b that are down-linked to the failed sensor node 31a to be unable to transfer their sensed ecological data to the WSN gateway unit of the invention 40, the node-failure event responding module 250 will detect this event and respond by issuing a redirection enable message to the failed-link redirecting module 260, thereby activating the failed-link redirecting module 260 to perform a failed link auto-redirecting operation for redirecting the down-linked good sensor nodes 31b for linking to a nearby good sensor node (such as the sensor node 31c shown in FIG. 4B). This failed link auto-redirecting operation allows the down-linked good sensor nodes 31b to be able to transfer their sensed ecological data via the newly-linked good sensor node 31c to the WSN gateway unit of the invention 40.

In conclusion, the invention provides a wireless sensor network gateway unit which is characterized by the provision of an failed link auto-redirecting capability, which can respond to the failure of any sensor node in the WSN system by performing a failed link auto-redirecting operation for redirecting the down-linked good sensor nodes for linking to a nearby good sensor node to thereby allow the down-linked good sensor nodes to be nevertheless able to transfer data to the WSN gateway unit of the invention. This feature allows the WSN gateway unit of the invention to maintain good operational reliability for the WSN system. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A wireless sensor network gateway unit for use in cooperation with a wireless sensor network and a wireless communication system, wherein the wireless sensor network is composed of a plurality of sensor nodes, for providing a data-transmission gateway function for the wireless sensor network to communicate with the wireless communication system;

the wireless sensor network gateway unit comprising:
a wireless sensor network linking module, which is used for wireless linking to the wireless sensor network for data exchange with each sensor node in the wireless sensor network to receive each set of ecological data acquired by each sensor node;
a wireless sensor network configuration module, which is capable of configuring the sensor nodes in the wireless sensor network based on a predetermined topology for allowing each sensor node to exchange data with the wireless sensor network linking module by a multihop routing method;
a data transmission module, which is capable of converting each received set of ecological data into a specific data format based on a wireless communication protocol that is compliant with the wireless communication system;
a wireless communication linking module, which is capable of linking to the wireless communication system for transmitting the formatted ecological data from the data transmission module to the wireless communication system;
a node-failure event responding module, which is capable of responding to a node-failure event in the wireless sensor network by issuing a redirection enable message; and
a failed-link redirecting module, which is capable of responding to the redirection enable message by performing a failed link auto-redirecting operation for the wireless sensor network.

2. The wireless sensor network gateway unit of claim 1, wherein the wireless sensor network system utilize the Zigbee wireless communication protocol for the sensor nodes to communicate with each other.

3. The wireless sensor network gateway unit of claim 1, wherein the wireless sensor network system utilize the Bluetooth wireless communication protocol for the sensor nodes to communicate with each other.

4. The wireless sensor network gateway unit of claim 1, wherein the wireless sensor network linking module utilizes the standard S-MAC (Sensor Media Access Control) protocol for data communication with the wireless sensor network system.

5. The wireless sensor network gateway unit of claim 1, wherein the topology used by the wireless sensor network configuration module for configuring the wireless sensor network is a tree topology.

6. The wireless sensor network gateway unit of claim 1, which has a built-in GPS (Global Positioning System) function for acquiring a set of GPS geographical position data for inclusion in the ecological data.

7. The wireless sensor network gateway unit of claim 1, which has a set of built-in sensing functions for acquiring the ecological data including temperature, humidity, sunlight amount, and wind speed.

8. The wireless sensor network gateway unit of claim 1, wherein the ecological data transmitted by the data transmission module includes geographical position, temperature, humidity, sunlight amount, wind speed, and pest number.

9. The wireless sensor network gateway unit of claim 1, wherein the data transmission module utilizes the SMS (Short Message Service) protocol for wireless transmission of the ecological data.

10. The wireless sensor network gateway unit of claim 1, wherein the data transmission module utilizes the GPRS (General Packet Radio Service) protocol for wireless transmission of the ecological data.

11. The wireless sensor network gateway unit of claim 1, wherein the wireless communication linking module is a GSM (Global System for Mobile Communications) linking module.

12. The wireless sensor network gateway unit of claim 1, further comprising:
a wireless sensor network management control module, which is capable of performing a set of host-specified management control actions on the wireless sensor network system in response to a set of management control commands issued by the host server and received via the wireless data communication system.

13. The wireless sensor network gateway unit of claim 12, wherein the management control actions performed by the wireless sensor network management control module include a clock synchronization process for clock synchronization of all the sensor nodes in the wireless sensor network.

14. The wireless sensor network gateway unit of claim 13, wherein the clock synchronization process performed by the wireless sensor network management control module is based an RBS (Reference Broadcast Synchronization) method.

15. The wireless sensor network gateway unit of claim 13, wherein the clock synchronization process performed by the wireless sensor network management control module is based a TPSN (Timing-sync Protocol for Sensor Networks) method.

16. The wireless sensor network gateway unit of claim 1, which is realized with a personal computer unit.

17. The wireless sensor network gateway unit of claim 1, which is realized with a programmable embedded microprocessor system.

18. A wireless sensor network gateway unit for use in cooperation with a wireless sensor network and a GSM (Global System for Mobile Communications) wireless communication system, wherein the wireless sensor network is composed of a plurality of sensor nodes, for providing a data-transmission gateway function for the wireless sensor network to communicate with the GSM wireless communication system;

the wireless sensor network gateway unit comprising:

a wireless sensor network linking module, which is used for wireless linking to the wireless sensor network for data exchange with each sensor node in the wireless sensor network to receive each set of ecological data acquired by each sensor node;

a wireless sensor network configuration module, which is capable of configuring the sensor nodes in the wireless sensor network based on a predetermined topology for allowing each sensor node to exchange data with the wireless sensor network linking module by a multihop routing method;

a data transmission module, which is capable of converting each received set of ecological data into a specific data format based on a wireless communication protocol that is compliant with the GSM wireless communication system;

a wireless communication linking module, which is capable of linking to the GSM wireless communication system for transmitting the formatted ecological data from the data transmission module to the GSM wireless communication system;

a node-failure event responding module, which is capable of responding to a node-failure event in the wireless sensor network by issuing a redirection enable message;

a failed-link redirecting module, which is capable of responding to the redirection enable message by performing a failed link auto-redirecting operation for the wireless sensor network; and a wireless sensor network management control module, which is capable of performing a set of host-specified management control actions on the wireless sensor network system in response to a set of management control commands issued by the host server and received via the wireless data communication system.

19. The wireless sensor network gateway unit of claim 18, wherein the wireless sensor network system utilize the Zigbee wireless communication protocol for the sensor nodes to communicate with each other.

20. The wireless sensor network gateway unit of claim 18, wherein the wireless sensor network system utilize the Bluetooth wireless communication protocol for the sensor nodes to communicate with each other.

21. The wireless sensor network gateway unit of claim 18, wherein the wireless sensor network linking module utilizes the standard S-MAC (Sensor Media Access Control) protocol for data communication with the wireless sensor network system.

22. The wireless sensor network gateway unit of claim 18, wherein the topology used by the wireless sensor network configuration module for configuring the wireless sensor network is a tree topology.

23. The wireless sensor network gateway unit of claim 18, which has a built-in GPS (Global Positioning System) function for acquiring a set of GPS geographical position data for inclusion in the ecological data.

24. The wireless sensor network gateway unit of claim 18, which has a set of built-in sensing functions for acquiring the ecological data including temperature, humidity, sunlight amount, and wind speed.

25. The wireless sensor network gateway unit of claim 18, wherein the ecological data transmitted by the data transmission module includes geographical position, temperature, humidity, sunlight amount, wind speed, and pest number.

* * * * *